United States Patent
Stone (10) Patent No.: US 11,384,653 B2
(45) Date of Patent: Jul. 12, 2022

(54) NEXT GEN RIFFLE SEAL

(71) Applicant: Parker-Hannifin Corporation, Cleveland, OH (US)

(72) Inventor: Stephen S. Stone, East Haven, CT (US)

(73) Assignee: Parker-Hannifin Corporation, Cleveland, OH (US)

(*) Notice: Subject to any disclaimer, the term of this patent is extended or adjusted under 35 U.S.C. 154(b) by 136 days.

(21) Appl. No.: 16/802,689

(22) Filed: Feb. 27, 2020

(65) Prior Publication Data
US 2020/0284156 A1      Sep. 10, 2020

Related U.S. Application Data

(60) Provisional application No. 62/814,327, filed on Mar. 6, 2019.

(51) Int. Cl.
| | | |
|---|---|---|
| *F01D 11/00* | (2006.01) | |
| *F16J 15/10* | (2006.01) | |
| *F16J 15/02* | (2006.01) | |

(52) U.S. Cl.
CPC .............. *F01D 11/005* (2013.01); *F16J 15/02* (2013.01); *F16J 15/10* (2013.01); *F16J 15/104* (2013.01); *F16J 15/106* (2013.01); *F05D 2220/32* (2013.01); *F05D 2240/55* (2013.01)

(58) Field of Classification Search
CPC .. F16J 15/00; F16J 15/02; F16J 15/021; F16J 15/022; F16J 15/025; F16J 15/027; F16J 15/10; F16J 15/102; F16J 15/104; F16J 15/106; F01D 11/00; F01D 11/0052; F01D 11/006; F01D 11/008; F05D 2220/32; F05D 2240/55
USPC ....................................................... 277/674
See application file for complete search history.

(56) References Cited

U.S. PATENT DOCUMENTS

| | | | |
|---|---|---|---|
| 4,537,024 A * | 8/1985 | Grosjean | F01D 11/005 415/139 |
| 5,088,888 A | 2/1992 | Bobo | |
| 6,926,284 B2 * | 8/2005 | Hirst | F01D 11/005 277/603 |
| 7,063,503 B2 | 6/2006 | Meisels | |

(Continued)

FOREIGN PATENT DOCUMENTS

| | | | | |
|---|---|---|---|---|
| GB | 2303888 A | * | 3/1997 | ........... F16J 15/0887 |
| GB | 2303888 A | | 3/1997 | |

*Primary Examiner* — Nathan Cumar
(74) *Attorney, Agent, or Firm* — Renner, Otto, Boisselle & Sklar, LLP (57) ABSTRACT

A seal assembly includes at least one primary seal, whose ends terminate in a modified air duct that is housed in a precision bore located at the ends of the primary seal slots. The air duct functions to seal the primary seal slot ends. A slot milled in the face of the air duct allows the primary seal to pass through and terminate centrally in the air duct bore. Minimal interference between the bore and air duct prevents cooling air from escaping the bore, completing the seal. Proper specification of the length of the primary seal in conjunction with precise location of the air duct bores allows for ample thermal expansion without loss of sealing. Axial clearance between the mating bores and air duct ends provides allowance for build tolerance, thermal expansion and movements between mating nozzles including movements between corresponding vane manifold portions.

19 Claims, 10 Drawing Sheets

(56) References Cited

U.S. PATENT DOCUMENTS

| | | |
|---|---|---|
| 8,201,834 B1 | 6/2012 | Liang |
| 8,714,565 B1 | 5/2014 | Cornett et al. |
| 8,753,073 B2 | 6/2014 | Albers et al. |
| 9,017,015 B2 | 4/2015 | Casavant et al. |
| 9,863,323 B2 | 1/2018 | Kirtley et al. |
| 9,945,484 B2 * | 4/2018 | Moehrle ............... F01D 11/003 |
| 9,951,640 B2 * | 4/2018 | Westphal .............. F01D 25/246 |
| 2006/0082074 A1 | 4/2006 | Synnott et al. |
| 2013/0028713 A1 * | 1/2013 | Giri ....................... F16J 15/064 |
| | | 415/135 |

* cited by examiner

NEXT GEN RIFFLE SEAL

RELATED APPLICATIONS

This application claims the benefit of U.S. Provisional Application No. 62/814,327 filed Mar. 6, 2019, which is incorporated herein by reference.

FIELD OF INVENTION

The present invention relates generally to seals, and more particularly to seals for high temperature applications (e.g., industrial gas turbines).

BACKGROUND

Current seal designs for the gap area include "riffle" or "feather" seals, which are strips of metal rectangular in cross section, placed in slots machined in the mating faces of the abutting shrouds. Such seals allow a significant amount of cooling to escape past the seal ends, which adds demand for critical compressor air. Some attempts to seal the ends to reduce the amount of escaping air require a significant amount of machining and assembly operations, such as the design disclosed in U.S. Pat. No. 8,201,834 issued Jun. 19, 2012, which utilizes multiple horizontal and vertical riffle seals.

SUMMARY OF INVENTION

The present invention provides a seal including an elongated main body and two opposing lips coupled to the main body and extending along the elongated main body and/or a duct with a duct body including an opening for receiving an end of the seal. The lips of the seal may form a concavity that enables the lips to be self-energizing. For example, the lips may have a C-shaped cross-section. The duct body may have two thick ends that are configured to seal against surfaces defining a bore that is configured to receive the duct body. For example, the duct body may have an hourglass shape with an opening in its side to receive an end of the seal. In an embodiment, a seal assembly includes air ducts with an hourglass shaped duct body and a seal, each end of the seal being received by a corresponding opening of the respective air duct.

The seal of the present application can be used in place of previously known riffle seals. For example, a turbine assembly including a seal of the present application can incorporate a small amount of interference between the seal and cavity walls, which can enable reduced leakage.

In an embodiment, an improvement to existing mate-face seals (e.g., "riffle seals") is provided. The improved primary seals enable sealing the ends of a cavity by means of an air duct. Other improvements to the seal can be made by replacing the current rigid designs with one that is more compliant, forming a better seal and allowing for misalignment during assembly.

Also, with or without the seal of the present application, significant improvement over previously known riffle seals can be achieved by integrating an air duct of the present application such that ends of the riffle seals would be received by a corresponding opening of the respective air duct. Accordingly, the air duct enables a significant decrease in leakage, and can be relatively simple to implement.

Additionally, the thick ends of the duct body may be spherical. Misalignment between mating nozzles during installation and operation is accommodated by means of the spherical diameter at each end of the air duct, in addition to a cross sectional feature incorporated in the primary seal allowing it to pivot in the slot.

A seal assembly may include at least one primary seal, whose ends terminate in a modified air duct that is housed in a precision bore located at the ends of the primary seal slots. The air duct functions to seal the primary seal slot ends, which current seals fail to do. A slot milled in the face of the air duct allows the primary seal to pass through and terminate centrally in the air duct bore.

Minimal interference between the bore and air duct prevents cooling air from escaping the bore, completing the seal. Proper specification of the length of the primary seal in conjunction with precise location of the air duct bores allows for ample thermal expansion without loss of sealing. Axial clearance between the mating bores and air duct ends provides allowance for build tolerance, thermal expansion and movements between mating nozzles—e.g., movements between corresponding vane manifold portions.

According one aspect of the invention, a seal assembly comprises a seal with a first end and a second end, and a duct including an opening configured to receive one of the first end and the second end, an end of the seal being configured to extend through the opening into the duct, and configured to expand in the duct.

According to another aspect of the invention, a seal comprises an elongated main body, and opposing lips connected to opposite sides of the elongated main body and extending along a length of the elongated main body. The elongated main body may include a planar surface. For example, the elongated main body may be planar.

According to another aspect of the invention, a duct comprises a duct body with an hourglass shape, and an opening in a side of the duct body.

The foregoing and other features of the invention are hereinafter described in greater detail with reference to the accompanying drawings.

DETAILED DESCRIPTION

The principles of this present application have particular application to gas turbines, and thus will be described below chiefly in this context. It will be appreciated that principles of this invention may be applicable to other systems where is desirable to separate fluid flows.

Figure 1:
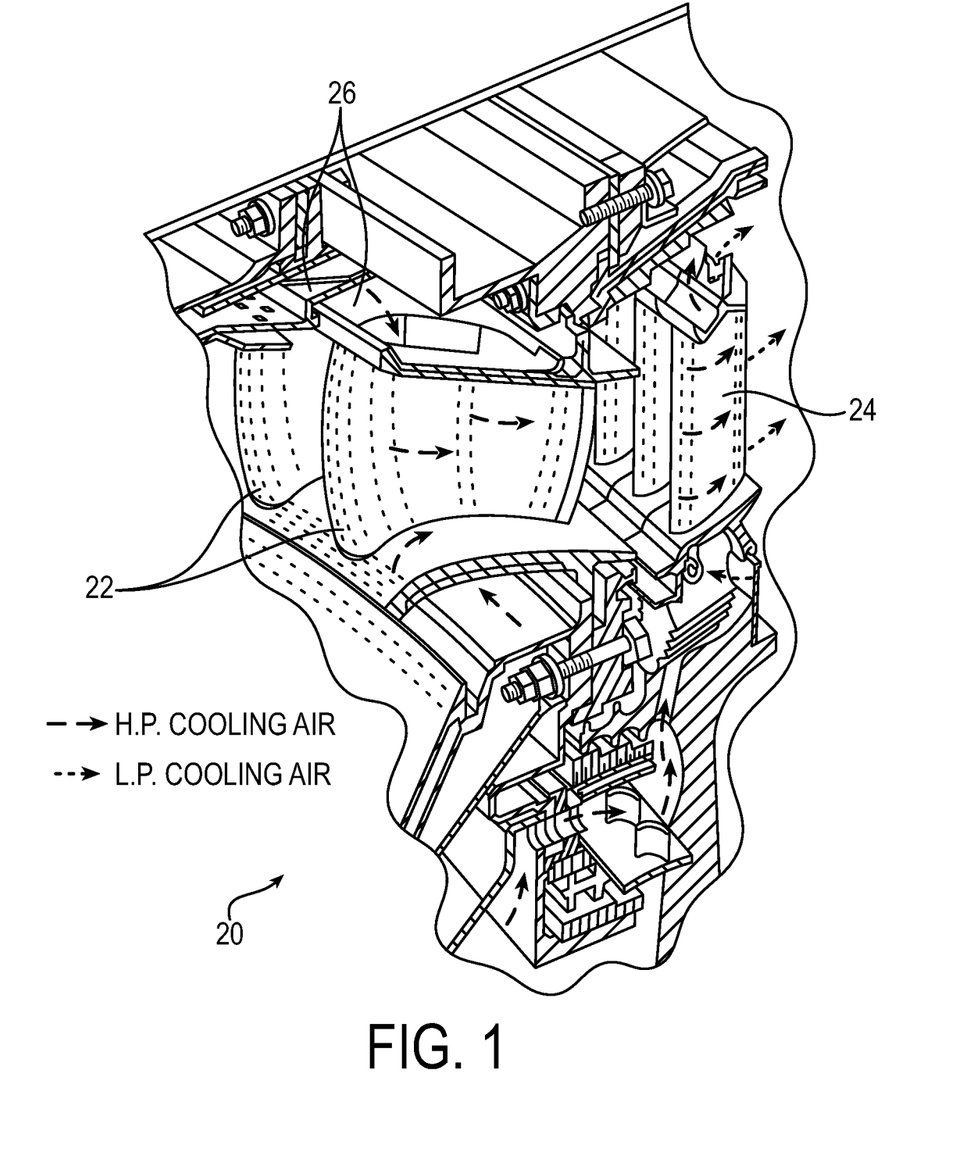
FIG. 1 is a partial oblique view of a gas turbine including multiple adjacent vane manifold portions.

As exemplified in FIG. 1, a large frame industrial gas turbine is partially shown at 20 and includes a turbine section containing multiple stages of stationary nozzles 22 (also referred to herein as "vanes") which serve to guide hot gas flow to stages of downstream rotating blades 24. Nozzle stages are comprised of multiple segments, each containing one or more airfoils whose ends terminate at an inner and outer block, or shroud (each portion also referred to herein as "vane manifold portions 26"). As nozzle segments are stacked against each other in the circumferential direction, a gap is created at the mating face. A seal, discussed with reference to FIG. 2 below, can be provided to prevent cooling air from entering the gap created by the mating vane manifold portions 26.

Figure 2:
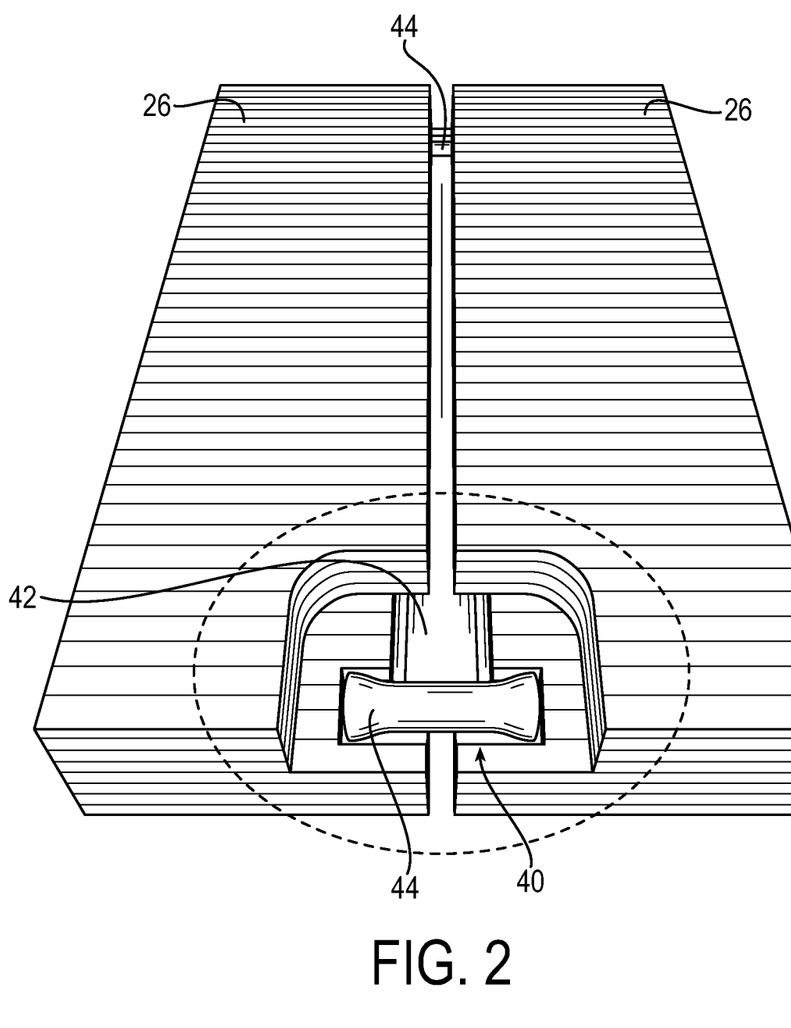
FIG. 2 is an oblique view of two adjacent vane manifold portions with a portion cut-away so that an exemplary seal assembly is partially viewable.

Referring now to FIG. 2, the gas turbine may include two seal assemblies 40, one of which is partially visible through a cut-out (circled in dashed lines) in a schematic representation of the two adjacent vane manifold portions 26. Each seal assembly 40 may include a seal 42 and an air duct 44 at each end of the corresponding seal 42.

Figure 3:
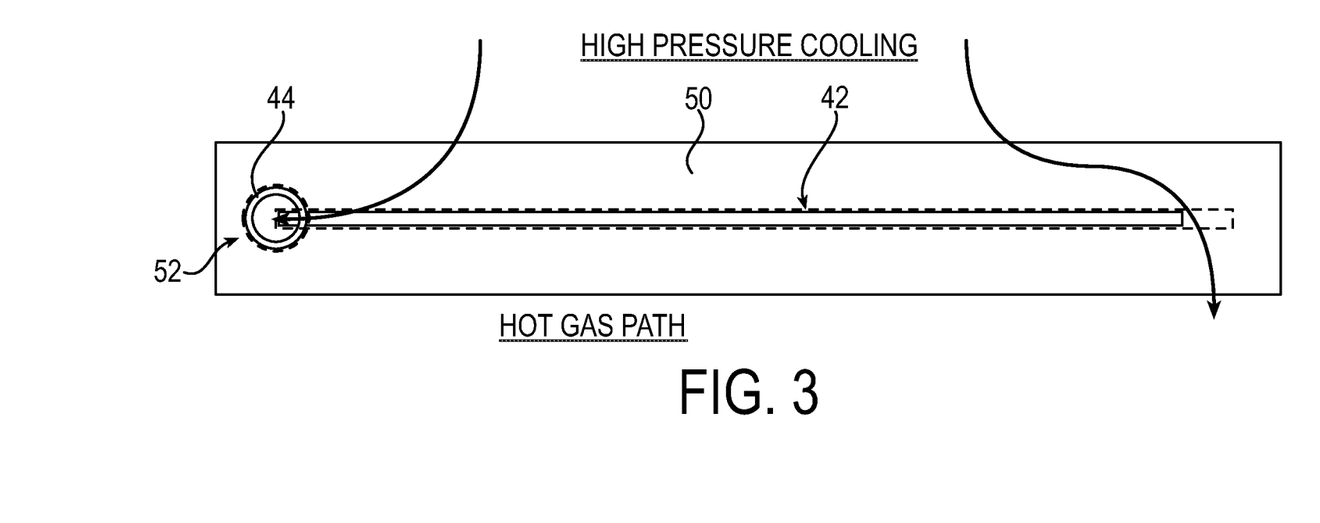
FIG. 3 is a partial cross-sectional front view of an assembly including a seal assembly with an air duct on one side and without an air duct on the other side.

Briefly referring to a different embodiment, FIG. 3 illustrates a comparison of paths a high pressure cooling air flow can take along sides of the seal 42 depending on whether an air duct 44 is or is not present. For example, FIG. 3 illustrates a different vane manifold portion 50 that is configured to receive a different seal assembly 52, which includes the seal 42 and an air duct 44 at only one end of the seal 42. As shown in FIG. 3, the high pressure cooling fluid on the side of the air duct 44 (the left side when viewing FIG. 3 upright) can be diverted through the air duct 44, which may have its ends sealed against a corresponding adjacent vane manifold portion 50. In contrast, the cooling air on the side without an air duct may provide a gap for the cooling air to flow through. In an embodiment, air ducts at both ends of the seal (e.g., the embodiment of FIG. 3) enable such a gap to not be present, and instead enable the cooling air to be diverted along both ends of the seal toward the corresponding air duct in a similar manner shown on the left side of FIG. 4.

Turning to FIG. 4 and referring again to the embodiment shown in FIG. 2, a front view of one vane manifold portion 26 is illustrated. The outer profile of the vane manifold portion 26 is illustrated schematically in FIG. 4 for simplification, as the outer profile can have the shape shown in FIG. 1 or another shape.

Figure 4:
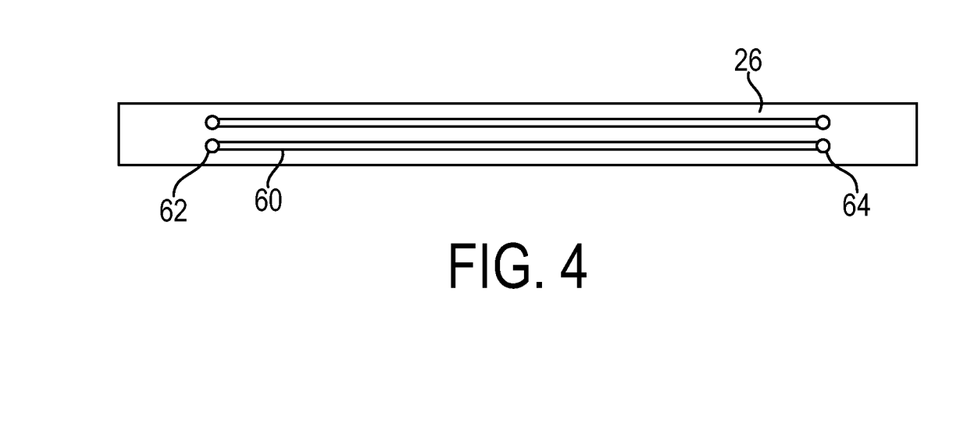
FIG. 4 is a front view of one of the vane manifold portions of FIG. 2, which includes two seal slots and two bores corresponding to each seal slot.

The vane manifold portion 26 may include two seal slots 60, each with corresponding bores 62 and 64 at a respective end of the corresponding seal slot 60. The seal slots 60 may each be configured to receive and seal against part of the seal 42, and the bores 62 and 64 each being configured to receive and seal against part of the corresponding air duct 44 (shown in FIG. 5).

Referring now to FIGS. 5-8, the air duct 44 may be configured for use in the gas turbine. For example, the duct 44 may be formed of metal (e.g., stainless steel 309).

The air duct 44 may include a duct body 66 that is generally cylindrical and hollow. For example, a through hole may extend through a length L of the duct body 66, concentric with the duct body 66. In an embodiment, the through hole is not provided, and for example, the ends of the duct body are closed.

Figure 5:
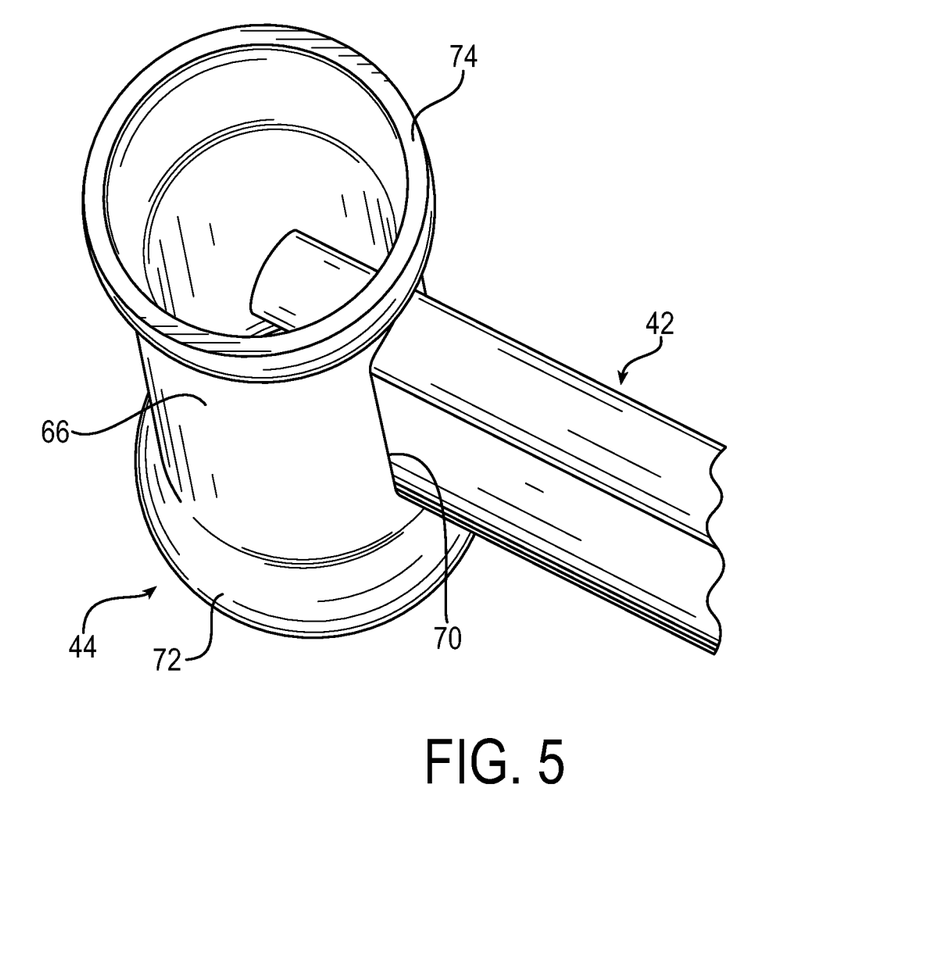
FIG. 5 is an oblique view of part of the seal assembly of FIG. 2.
Figure 6:
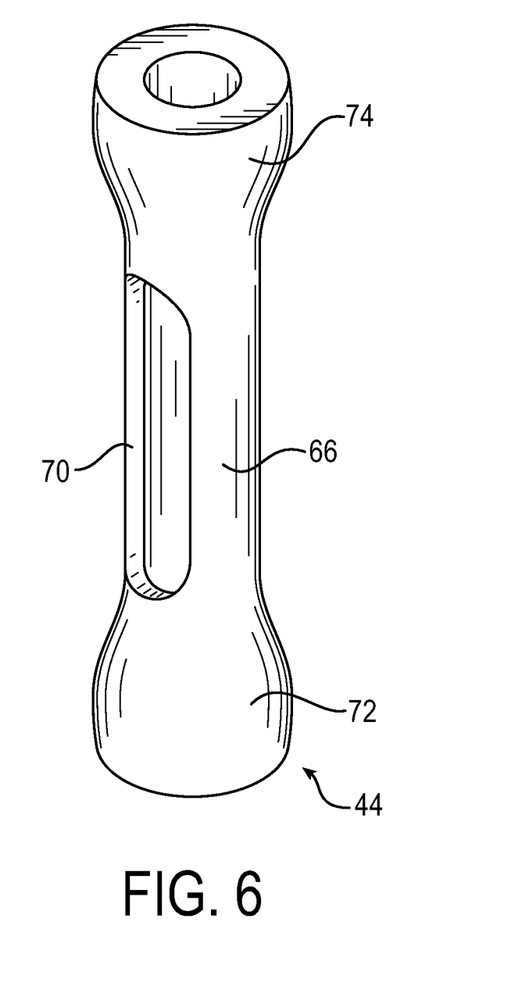
FIG. 6 is an oblique view of an air duct of the seal assembly of FIG. 5.
Figure 7:
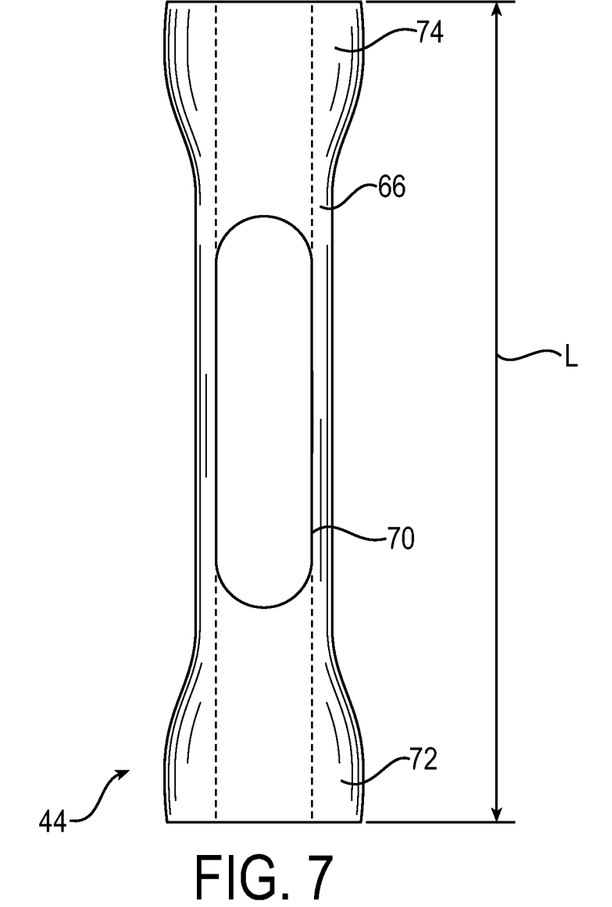
FIG. 7 is a side view of the air duct of FIG. 6.
Figure 8:
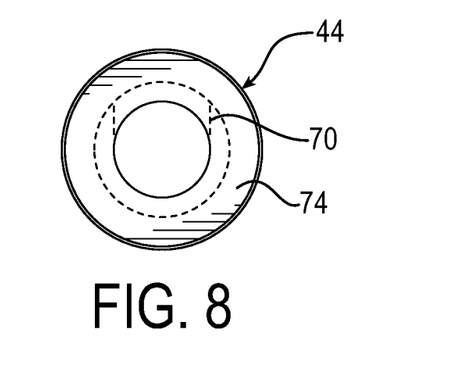
FIG. 8 is a top view of the air duct of FIG. 7.

The air duct 44 includes an opening 70 that is configured to receive an end of the seal 42 (shown only in FIG. 5). The duct body 66 may include an elongated surface that defines a portion of the opening 70 and faces the seal 42. For example, the elongated surface may be planar and face an opposing planar surface that defines another portion of the opening 70.

The opening 70 may lead to the through hole of the air duct. For example, the corresponding end of the seal 42 may extend only partially into the air duct 44 so that the seal 42 is able to linearly expand further into the through hole when heated. In an embodiment without a through hole, the opening leads to a chamber within the air duct body, the chamber being configured to receive expanding portions of the seal.

The opening 70 may have a size that is about the same as the corresponding end of the seal 42 received in the opening 72. For example, the length and thickness of the opening 70 may be the same as the respective width W (identified in FIG. 12) and thickness T (identified in FIG. 12) of the seal 42. In an embodiment, the length and/or thickness of the opening is slightly less than the corresponding width and/or thickness of the seal ends so that the seal interference fits in the opening.

The air duct 44 may include thick portions 72 and 74 at either end to seal against a surface defining the corresponding bore 62 or 64 of the corresponding vane manifold portion 26 (shown in FIG. 4). For example, the air duct 44 may have an hourglass shape or the thick portions may have a spherical shape that is configured to seal against a surface defining the corresponding bore 62 or 64.

The spherical shape of each end enables the ends to assemble with mating vane manifold portions 26 (shown in FIGS. 1 and 2) even when misalignment exists between the mating vane manifold portion 26. In an embodiment, the ends of the air duct do not flare radially outwardly at the top and bottom. For example, the outer profile of the air duct body may be the same as a right circular cylinder (i.e., the duct body may be straight and not flared radially outward at the top and bottom) and include a relief.

Figure 9:
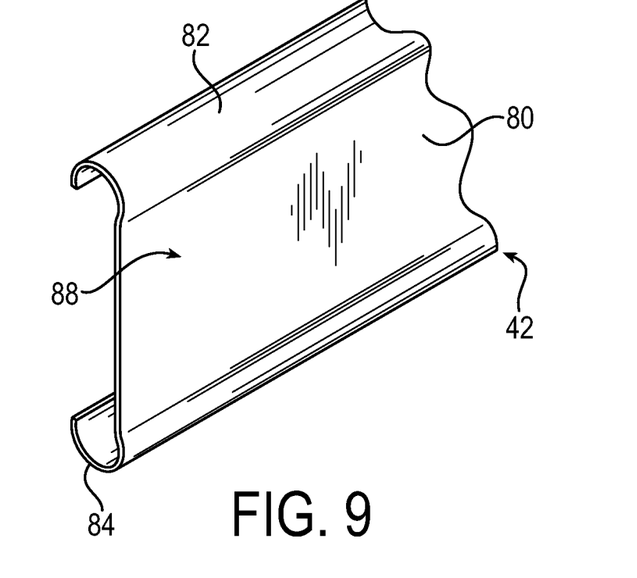
FIG. 9 is an oblique view of a seal of the seal assembly of FIG. 5.

Turning now to FIG. 9, the seal 42 may be configured for use in a gas turbine. For example, the seal 42 may be formed of metal (e.g., inconel 718).

The seal 42 may include an elongated main body 80 and a pair of opposing lips 82 and 84. The seal 42 may have a uniform cross-section throughout the entire length of the seal 42. For example, the elongated main body 80 may be planar and extend the entire length of the seal 42 and the lips 82 and 84 may extend the entire length of the seal 42. Providing the elongated main body 80 with a planar surface—that faces the planar surface, of the elongated surface of the duct body 66, that defines a portion of the opening 70—enables manufacturing costs of the duct body 66 to be reduced compared to other geometries of the opening 70.

For example, matching of the profiles of the elongated surface, of the duct body 66, and the planar portion, of the elongated main body 80, enables airflow between the elongated main body 80 and the duct body 66 to be reduced or prevented (e.g., when heated), as discussed further below. Also, machining the opening 70 such that the planar surface defines a portion of the opening 70 to match the profile of the planar portion of the elongated main body 80 can be simpler and cheaper compared to machining more complicated curved surfaces to match a curvature of a different seal.

When at a room temperature state, the ends of the elongated main body 80 may be configured to terminate in a center of the corresponding air duct 44 (shown in FIG. 5). During a transient state (e.g., during turbine engine heating) the seal 42 may expand faster than the corresponding vane manifold portions 26 (shown in FIGS. 1 and 2), which may result in the seal 42 expanding longitudinally into a clearance portion of the air duct 44. For example, the seal 42 may expand longitudinally about a few thousandths of an inch into one or both corresponding air ducts 44.

Figure 10:
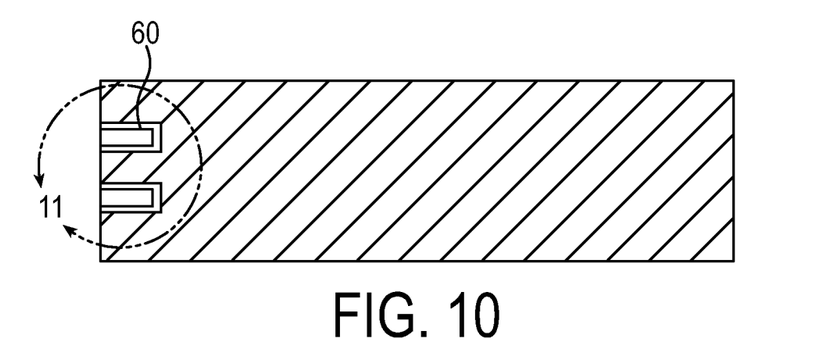
FIG. 10 is a cross-sectional side view of the vane manifold portion of FIG. 4 through two of the bores.
Figure 11:
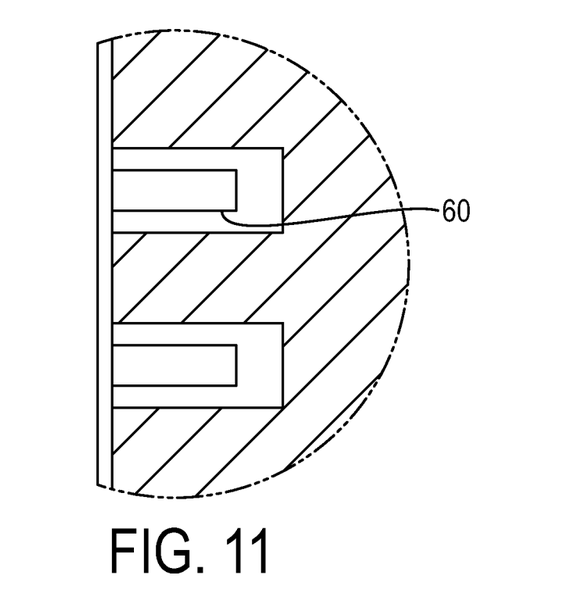
FIG. 11 is an enlarged cross-sectional side view of part of the vane manifold portion of FIG. 10.

Each lip 82 and 84 extend in front of the main body portion so that an outer surface of each lip 82 is able to seal against a surface of the corresponding seal slot 60 (illustrated in detail in FIGS. 10-11). For example, each lip 82 and 84 may mirror the other and have the same shape and thickness. In an alternative embodiment, the lips are different from one another.

Each lip 82 and 84 may have a back portion that extends rearward beyond the elongated main body 80. For example, the back of the elongated main body 80 and the lips 82 and 84 forms a recess 88.

Figure 12:
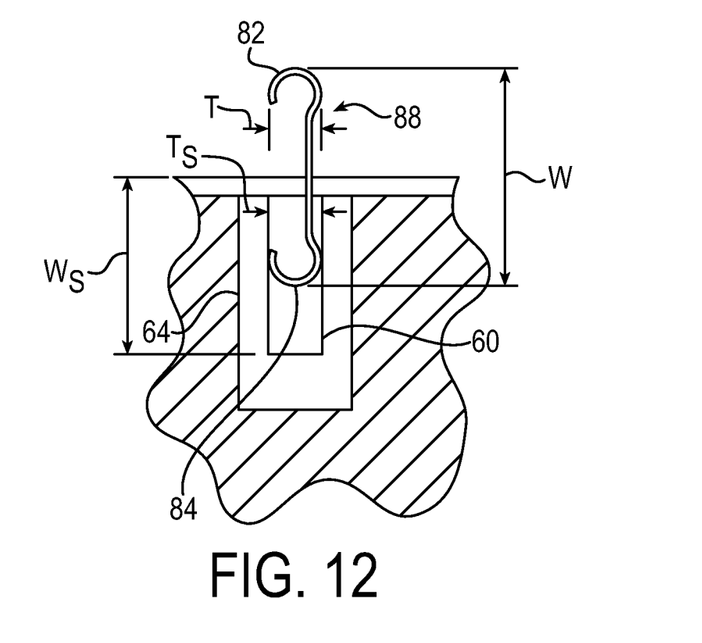
FIG. 12 is a cross-sectional side view of the vane manifold portion of FIG. 10 in combination with the seal of FIG. 9, without the air duct of FIG. 6 present.

Turning to FIG. 12, the lips 82 and 84 may form respective concavities that enable the lips 82 and 84 to seal in a self-energized manner. For example, the lips 82 and 84 may be generally C-shaped and include a free end and a fixed end that is attached to a corresponding end of the elongated main body 80. The fixed ends may be able to flex or pivot relative to the elongated main body 80, which enables the lips 82 and 84 to rotate as the seal 42 expands (e.g., due to heating).

The rotation of the lips 82 and 84 enables the lips 82 and 84 to maintain their sealing performance when the seal 42 expands. For example, when the width of the elongated main body 80 expands causing the fixed ends of the lips 82 and 84 to move away from one another, the lips 82 or 84 may rotate inwardly toward one another in the corresponding seal slots 60 (shown in FIG. 4).

The rotation of the lips 82 or 84 may urge the elongated main body 80 to move backward relative to the lips 82 and 84. Backward movement of the elongated main body 80 relative to the lips 82 and 84 may reduce the thickness of the recess 88. Reducing the thickness may further limit air leakage. For example, the planar surface of the elongated main body 80 may contact the planar surface of the duct body 66 that defines a portion of the opening 70 to prevent air flow therebetween.

The lips 82 and 84 may be interference fit in the seal slot 60. For example, the thickness of the lips 82 and 84 may be slightly greater than a thickness Ts of the seal slot 60. In an embodiment, the lips have the same thickness as the seal slot.

Figure 13:
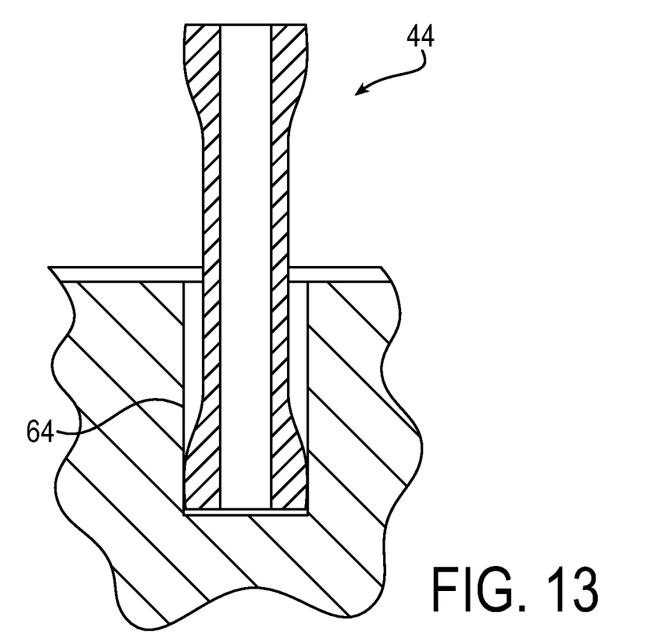
FIG. 13 is a cross-sectional opposite side view of the vane manifold portion of FIG. 10 in combination with the air duct of FIG. 6, without the seal of FIG. 12 present.

Turning to FIG. 13, the air duct 44 is illustrated inside the bore 64. As shown, the spherical outer surface of one end seals against the surface defining the bore 64.

When fully assembled, the other end of the air duct 44 would seal against a surface defining a corresponding bore of an adjacent mating vane manifold portion. In another embodiment, the ends of the air duct are not sealed against the surfaces defining the respective bores. For example, as mentioned above, each end of the air duct may be closed.

Figure 14:
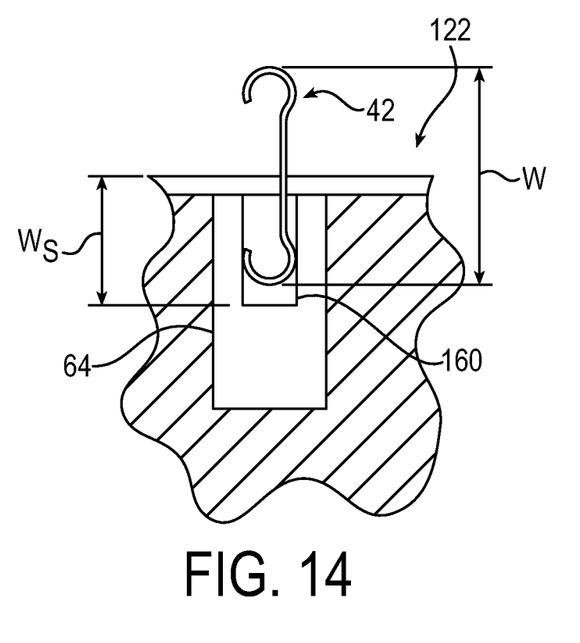
FIG. 14 is a cross-sectional side view of another exemplary embodiment of a vane manifold portion with a seal passage having a shorter width than the embodiment shown in FIG. 12.

Turning now to FIG. 14, another embodiment of the vane manifold portion is shown at 122. The vane manifold portion 122 includes a seal slot 160 that has a width (part of which is identified as $W_s$) less than the width (part of which is identified as $W_s$ in FIG. 12) of the seal slot 60 shown in FIG. 12. As shown, the seal 42 may be in the same position relative to the rest of the vane manifold portion 122 (e.g., relative to the bore 64) as the seal 42 would be in the vane manifold portion 22 shown in FIG. 12 above. Accordingly, the width of either of the seal slots 60 or 160 can be made without tight tolerances, thereby enabling manufacturing costs to be relatively low.

Figure 15:
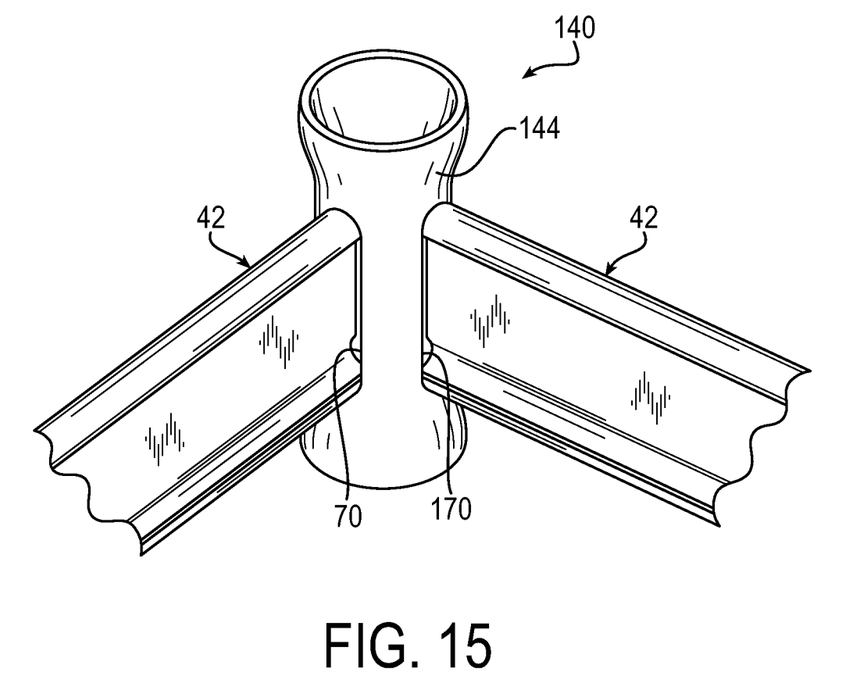
FIG. 15 is an oblique view of another embodiment of the seal assembly including an air duct with two openings in receipt of two seal ends.

Turning now to FIG. 15, an exemplary embodiment of the seal assembly is shown at 140. The seal assembly 140 is substantially the same as the above-referenced seal assembly 40, and consequently the same reference numerals to denote structures corresponding to similar structures in the seal assembly 140. In addition, the foregoing description of the seal assembly 40 is equally applicable to the seal assembly 140 except as noted below. Moreover, it will be appreciated that aspects of the seal assemblies may be substituted for one another or used in conjunction with one another where applicable.

The seal assembly 140 includes an air duct 144 that can act as a junction for multiple seals 42. For example, the air duct 144 includes an opening 70 and another opening 170 that can receive an end of a different seal 42. In an embodiment, the air duct receives three or more seals. For example, the seals may form a T-intersection.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seal assembly, comprising:
    a seal with a first end and a second end spaced apart in a longitudinal direction; and
    a duct including an opening to a through hole or a chamber of the duct, the opening being configured to receive one of the first end and the second end;
    wherein at least one of the first end and the second end of the seal is configured to extend through the opening partially into the duct, and configured to expand in the longitudinal direction further into the duct when the seal is heated.

2. The seal assembly of claim 1, wherein the seal is configured to seal against a surface of the opening.

3. The seal assembly of claim 1, further comprising a second duct, wherein the second duct includes a second opening configured to receive the other one of the first end and the second end.

4. A manifold comprising:
   the seal assembly of claim 1, wherein the manifold includes a seal slot that is configured to receive part of the seal.

5. The manifold of claim 4, wherein the seal is interference fit in the seal slot.

6. The manifold of claim 4, further comprising a bore connected to one end of the seal slot, wherein the bore is configured to receive the duct.

7. A manifold assembly comprising:
   the manifold of claim 4;
   a second manifold including a second seal slot that is configured to receive another part of the seal.

8. A gas turbine comprising the manifold assembly of claim 7.

9. The seal assembly of claim 1, wherein the seal comprises:
   an elongated main body; and
   opposing lips connected to opposite sides of the elongated main body in a direction perpendicular to the longitudinal direction and extending along a length of the elongated main body in the longitudinal direction;
   wherein the elongated main body includes a planar surface.

10. The seal assembly of claim 9, wherein the opposing lips of the seal are configured to pivot relative to the elongated main body, and wherein a back of the elongated main body and a back of the opposing lips form a recess.

11. The seal assembly of claim 9, wherein the opposing lips of the seal are self-energizing.

12. The seal assembly of claim 9, wherein each of the opposing lips of the seal include a concavity, and the concavities face toward one another.

13. The seal assembly of claim 1, wherein the duct comprises:
   a duct body with an hourglass shape, wherein the opening is in a side of the duct body.

14. The seal assembly of claim 13, wherein each end of the duct body is flared radially outward.

15. The seal assembly of claim 13, further comprising the through hole extending through a length of the duct body.

16. A manifold comprising:
   a seal assembly including:
      a seal with a first end and a second end spaced apart in a longitudinal direction; and
      a duct including an opening to a through hole or a chamber of the duct, the opening being configured to receive one of the first end and the second end, wherein at least one of the first end and the second end of the seal is configured to extend through the opening partially into the duct and expand in the longitudinal direction further into the duct when the seal is heated; and
   a seal slot that is configured to receive part of the seal; and
   a bore connected to one end of the seal slot, wherein the bore is configured to receive the duct.

17. The manifold of claim 16, wherein the seal is interference fit in the seal slot.

18. A manifold assembly comprising:
   the manifold of claim 16;
   a second manifold including a second seal slot that is configured to receive another part of the seal.

19. A gas turbine comprising the manifold assembly of claim 18.

* * * * *